United States Patent
Liu et al.

(10) Patent No.: US 11,100,074 B2
(45) Date of Patent: Aug. 24, 2021

(54) METHOD AND DEVICE FOR MANAGING DOCUMENT INDEX

(71) Applicant: EMC IP Holding Company LLC, Hopkinton, MA (US)

(72) Inventors: Min Liu, Shanghai (CN); Yong Zhang, Shanghai (CN); Yifan Huang, Shanghai (CN); Yubing Zhang, Shanghai (CN); Ke Zhao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 274 days.

(21) Appl. No.: 16/119,356

(22) Filed: Aug. 31, 2018

(65) Prior Publication Data
US 2019/0325033 A1 Oct. 24, 2019

(30) Foreign Application Priority Data
Apr. 20, 2018 (CN) .......................... 201810358924.7

(51) Int. Cl.
*G06F 16/22* (2019.01)
*G06F 16/93* (2019.01)
*G06F 16/23* (2019.01)

(52) U.S. Cl.
CPC ...... *G06F 16/2255* (2019.01); *G06F 16/2365* (2019.01); *G06F 16/93* (2019.01)

(58) Field of Classification Search
CPC . G06F 16/951; G06F 16/1734; G06F 16/2255
See application file for complete search history.

(56) References Cited

U.S. PATENT DOCUMENTS

| | | | | |
|---|---|---|---|---|
| 10,657,061 | B1* | 5/2020 | Marriner | H04L 41/0806 |
| 2014/0181122 | A1* | 6/2014 | Jain | G06F 16/328 |
| | | | | 707/749 |
| 2017/0315858 | A1* | 11/2017 | Borah | G06F 11/3072 |
| 2018/0159731 | A1* | 6/2018 | Murthy | H04L 12/1859 |

* cited by examiner

*Primary Examiner* — Mariela Reyes
*Assistant Examiner* — Courtney Harmon
(74) *Attorney, Agent, or Firm* — Chamberlain, Hrdlicka, White, Williams & Aughtry (57) ABSTRACT

Embodiments of the present disclosure provide a method and device for managing document indexes. The method includes in response to a request for adding a target segment to a document set including a plurality of segments, determining an original segment associated with the target segment from the plurality of segments, partitioning the original segment into a first portion and a second portion, the first portion being used to update the original segment, the second portion being used as the target segment, and rebuilding indexes for documents in the target segment.

9 Claims, 11 Drawing Sheets

METHOD AND DEVICE FOR MANAGING DOCUMENT INDEX

FIELD

Embodiments of the present disclosure generally relate to document indexes, and more specifically, to a method and a device for managing document indexes.

BACKGROUND

Typically, there are various frameworks that provide a capability of searching and returning a matched document to a user. Some distributed search engines distribute index data over many nodes, and thus a query on an index can be executed simultaneously by many nodes. The result obtained by these nodes can be combined and returned to the user.

However, the user needs to determine how many partitions (which are also referred to as shards, segments or the like) an index is distributed across, and the number cannot be changed after being created. This is because changing the number needs to rehash basically all the documents corresponding to the partitions. Moreover, as the system data increases, the performance of these traditional systems may deteriorate dramatically.

SUMMARY

In order to solve the above and other potential problems, embodiments of the present disclosure provide a method and a device for managing document indexes.

According to an aspect, there is provided a method of managing document indexes.

The method comprises: in response to a first request for adding a target segment to a document set including a plurality of segments, determining an original segment associated with the target segment from the plurality of segments; partitioning the original segment into a first portion and a second portion, the first portion being used to update the original segment, the second portion being used as the target segment; and rebuilding indexes for documents in the target segment.

According to an aspect, there is provided a device for managing document indexes. The device comprises: a processing unit; and a memory coupled to the processing unit and including instructions stored thereon, the instructions when executed by the processing unit causing the device to perform a method. The method comprises: in response to a first request for adding a target segment to a document set including a plurality of segments, determining an original segment associated with the target segment from the plurality of segments; partitioning the original segment into a first portion and a second portion, the first portion being used to update the original segment, the second portion being used as the target segment; and rebuilding indexes for documents in the target segment.

According to an aspect, there is provided a computer readable medium storing machine executable instructions thereon which, when executed by at least one processor, cause the at least one processor to perform methods according to one or more aspects of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description on the example embodiments of the present disclosure with reference to the accompanying drawings, the above and other objectives, features, and advantages of the present disclosure will become more apparent, in which the same reference symbols refer to the same components.

DETAILED DESCRIPTION OF EMBODIMENTS

The preferred embodiments disclosed herein will be described in detail below with reference to the accompanying drawings. Although the drawings illustrate the preferred embodiments of the present disclosure, it would be appreciated that the present disclosure can be implemented in various forms but cannot be limited by the embodiments described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

Figure 1A:
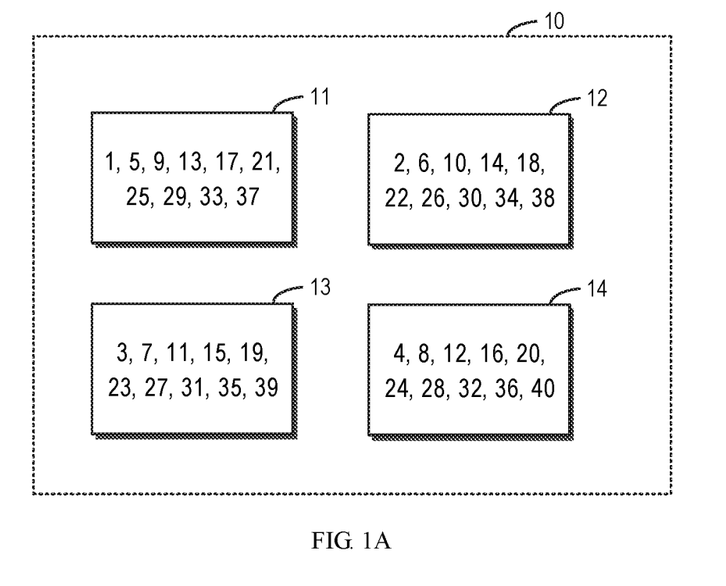
FIGS. 1A-1B illustrate diagrams of index management according to the prior art.
Figure 1B:
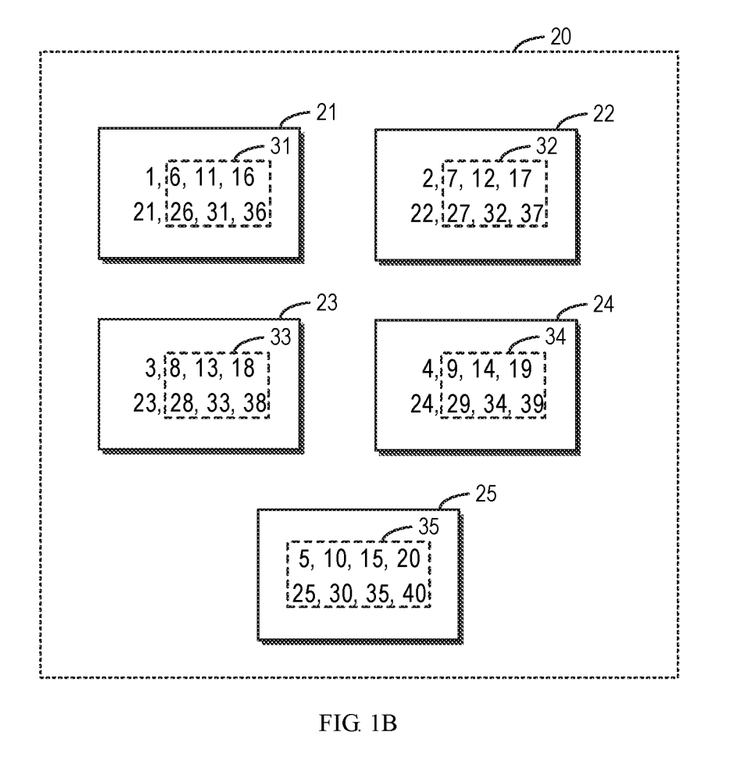

FIGS. 1A and 1B illustrate diagrams for index management according to the prior art. For example, a partition corresponding to each document can be determined by a simple modulus method. As shown in FIG. 1A, the index 10 includes four partitions 11-14, and each numeral in each of the partitions represents a document. The index 10 includes 40 documents, in which each partition includes 10 documents. A partition 11 includes all documents having a remainder 1 mod 4, a partition 12 includes all documents having a remainder 2 mod 4, a partition 13 includes all documents having a remainder 3 mod 4, and a partition 14 includes all documents having a remainder 0 mod 4.

In some cases, there may be a need for adding one partition to the index 10 to improve the performance. As shown in FIG. 1B, after adding a partition, an index 20 may be obtained, which includes five partitions 21-25. It is seen from comparison of partitions 11-14 with 21-25 that indexes are required to be rebuilt for all documents within blocks 31-35. As the number of partitions increases, the number of indexes to be rebuilt increases. Therefore, there arises a need of a solution for solving the technical problem in management of a document index.

Figure 2:
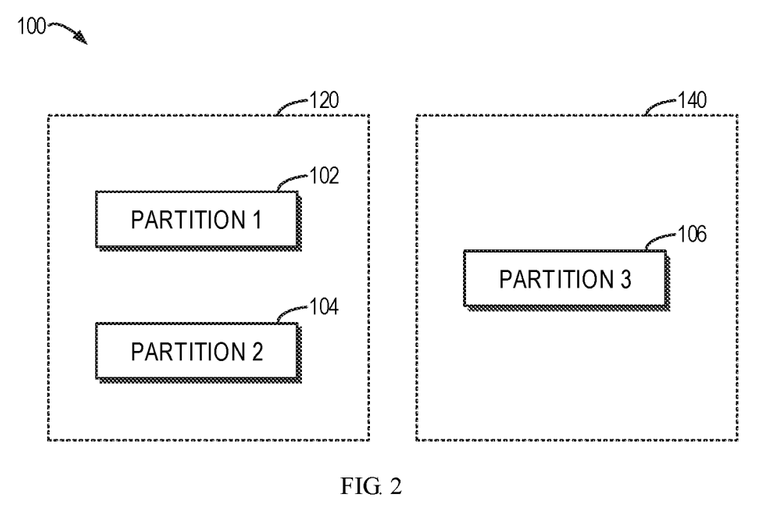
FIG. 2 illustrates a diagram of architecture of managing a document index according to embodiments of the present disclosure.

FIG. 2 illustrates a diagram of architecture of managing a document index according to embodiments of the present disclosure. As shown in FIG. 2, a cluster 100 includes nodes 120 and 140, each hosting at least one partition of a certain index. For example, the node 120 hosts a first partition 102 and a second partition 104, and the node 140 hosts a third partition 106. It would be appreciated that FIG. 2 is provided only as an example, the cluster 100 can include more or fewer nodes, and each node can include more or fewer partitions. In addition, some known aspects of the cluster 100 are not shown in order not to obscure various aspects of the present disclosure.

Figure 3A:
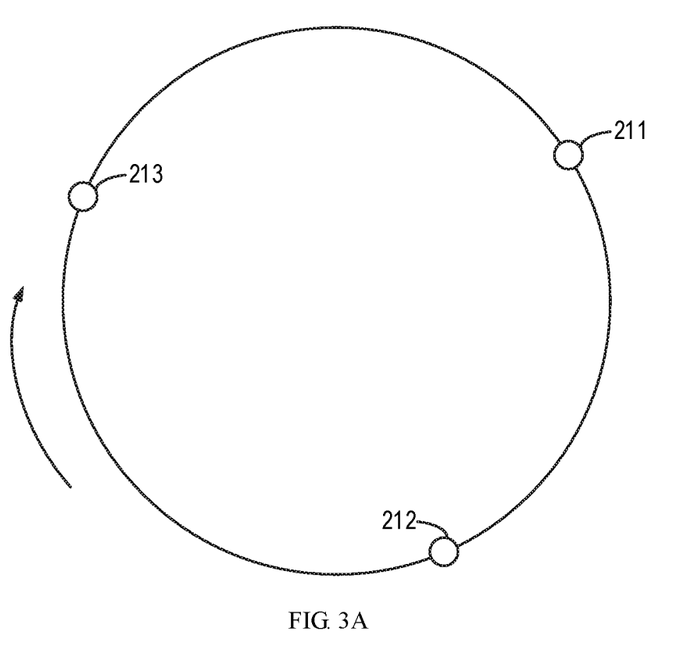
FIGS. 3A-3B illustrate diagrams for index management according to some embodiments of the present disclosure.
Figure 3B:
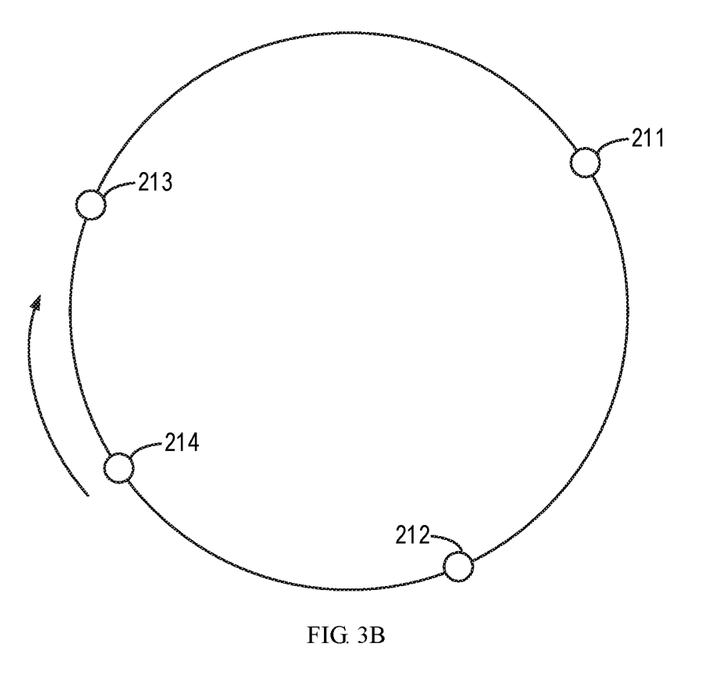

FIGS. 3A-3B illustrate diagrams for index management according to some embodiments of the present disclosure. As shown in FIG. 3A, circles 211-213 represent values corresponding to three partitions 102-106, for example, Hash values. The three values are located on a closed ring, which can be, for example, a consistent Hash ring. The three values can divide the closed ring into three portions, for example, three ranges of values. For example, the closed ring can represent a range of values from 0 to $2^N-1$. Each partition can correspond to a range of values. For example, a range of values corresponding to a circle can be specified as a range of values represented by moving from the circle in a clockwise direction; or a range of values corresponding to a circle can also be specified as a range of values represented by moving from the circle in a counterclockwise direction. For simplicity, moving in the clockwise direction will be described as an example, but it would be appreciated that the below description could also be applied to the counterclockwise direction.

In some embodiments, the cluster 100 can receive a request for adding a partition (for example, a fourth partition). When a fourth partition is added to the first to third partitions 102-106, a value (for example, a Hash value) associated with the newly added fourth partition can be determined, which is shown as a circle 214 in the FIG. 3B. As shown in FIG. 3B, the range of values associated with the second partition 104 (between circles 212 and 213) can be divided into two portions based on the above values, in which a first portion is a portion between the circles 212 and 214, and a second portion is a portion between the circles 214 and 213. According to the clockwise rule, the first portion is a range of values corresponding to the second partition 104, and the second portion is a range of values corresponding to the newly added partition. Hence, the first portion acts as the updated second partition, and the second portion acts as the newly added fourth partition. For documents in the fourth partition, an index can be rebuilt.

After the fourth partition is determined, the fourth partition can be migrated to its target location. For example, the target location can be the node 120 or 140 as shown in FIG. 2. It can be seen from comparison of FIG. 3A to FIG. 3B that the first partition and the third partition can remain unchanged, and only a portion of the second partition is required to be divided to be the fourth partition. Therefore, in case of adding one partition, an index is required to be rebuilt only for a small portion of data, so as to improve the performance of the system. It would be appreciated that, although the index has been described as being divided into a plurality of partitions, the partitions can also be referred to as shards or segments, and the present disclosure is not limited in this regard.

Figure 4A:
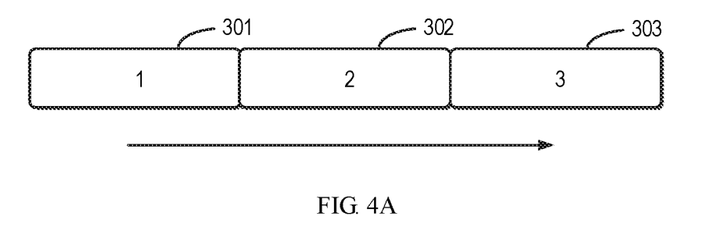
FIGS. 4A-4B illustrate diagrams for index management according to some embodiments of the present disclosure.
Figure 4B:
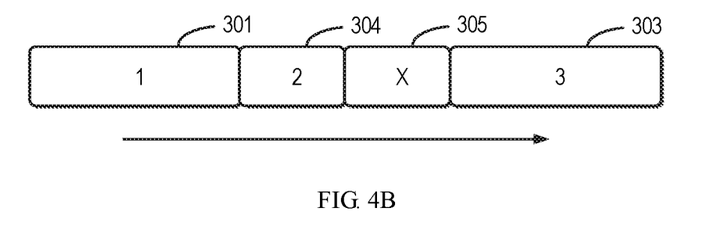

In order to show some concept of the present disclosure, FIGS. 4A and 4B illustrate diagrams of index management according to some embodiments of the present disclosure in another different perspective. FIGS. 4A and 4B can be regarded as diagrams by disassembling the rings in FIGS. 3A and 3B. In FIG. 4A, the first to third ranges of values 301-303 correspond to the first to third partitions 102-106, respectively. After the fourth partition is added, because the value corresponding to the fourth partition falls within the second range of values 302, the second partition 104 can be divided into two portions, namely the first portion 304 and the second portion 306. The first portion 304 acts as the updated second partition 104, and the second portion 305 acts as the newly added fourth partition.

Figure 5A:
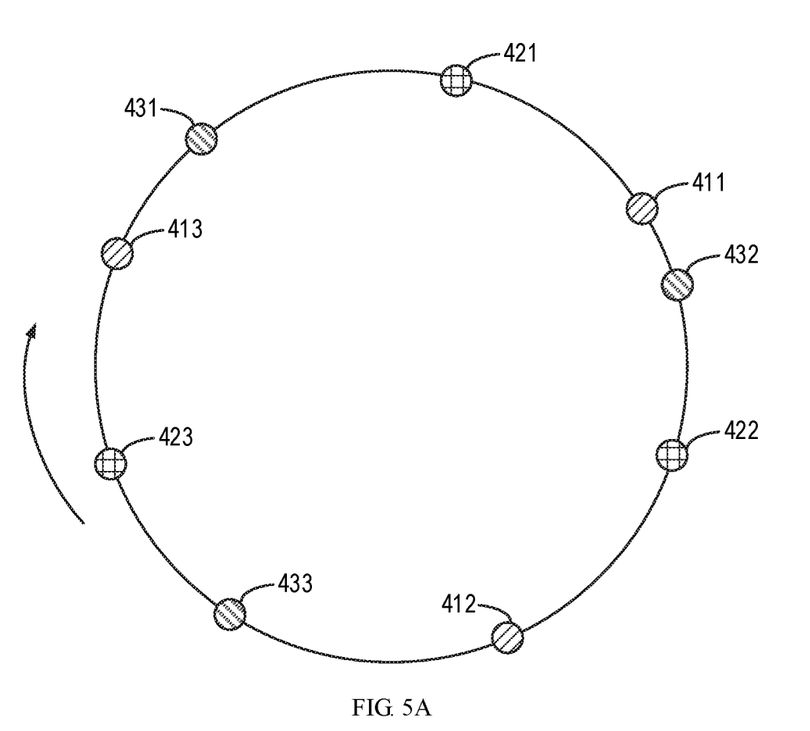
FIG. 5A-5B illustrate diagrams for index management according to some embodiments of the present disclosure.
Figure 5B:
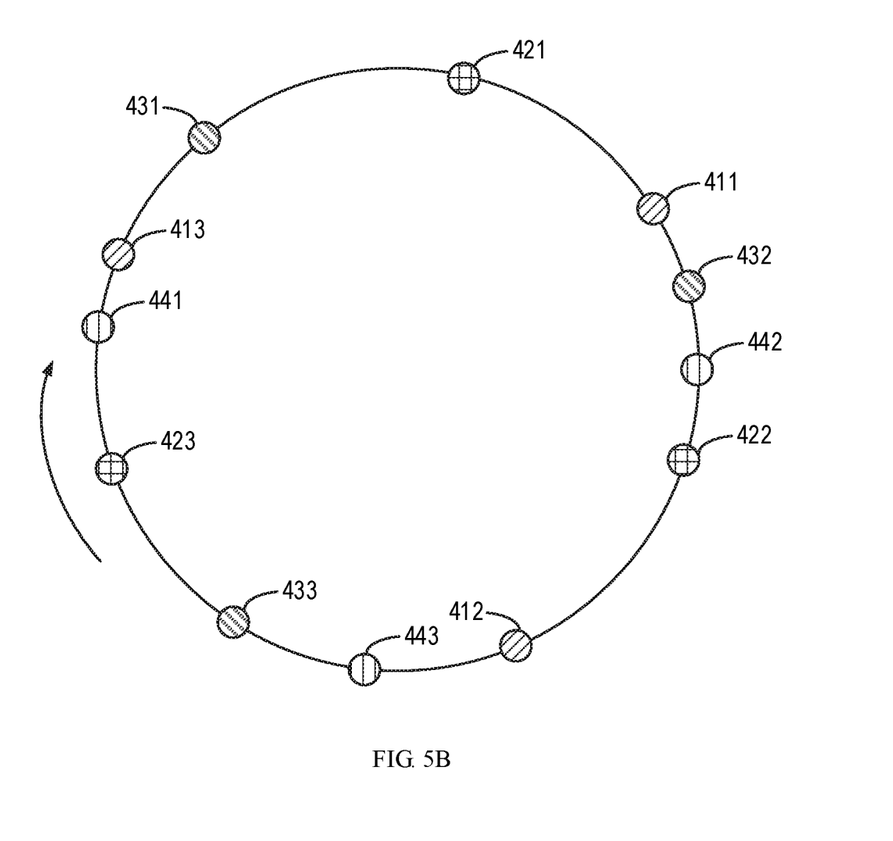

FIGS. 5A and 5B illustrate diagrams of index management according to some embodiments of the present disclosure. In the embodiment, different from the foregoing example, each partition can further include a plurality of segments. For example, as shown in FIGS. 5A and 5B, each partition can include three segments. However, it would be appreciated that this is provided only as an example, each partition can include more or fewer segments, and the segments included in each partition can also be different.

As shown in FIG. 5A, circles 411-413 denote values correspond to three segments included in the first partition 102; circles 421-423 denote values corresponding to three segments included in the second partition 104; and circles 431-433 denote values corresponding to three segments included in the third partition 106. These values can be Hash values of the respective segments. Each segment can correspond to a range of values. For example, a range of values corresponding to a circle can be specified as a range of values represented by moving from the circle along a clockwise direction; or a range of values corresponding to a circle can also be specified as a range of values represented by moving from the circle along a counterclockwise direction. For simplicity, moving in the clockwise direction will be described as an example, but it would be appreciated that the below description could also be applied to the counterclockwise direction.

In some embodiments, the cluster 100 can receive a request for adding a partition (for example, a fourth partition). For example, a fourth partition can be added to the first to third partitions 102-106, which may also include three segments. The values corresponding to the three segments can be determined, shown as circles 441-443 in FIG. 5B, respectively. As shown in FIG. 5B, the range of values associated with the respective segment can be divided into two portions based on these values. For example, the circle 441 partitions the segment from the circle 423 to the circle 413 into two portions, in which a first portion (from the circle 423 to the circle 441) is a range of values corresponding to the third segment of the second partition 104, and the second portion (from the circle 441 to the circle 413) is a range of values corresponding to the newly added segment. An index can be rebuilt for the documents in the second portion to form a first segment of the fourth partition. Other newly added circles (i.e., segments) can be processed likewise.

After three segments corresponding to the fourth partition have been determined, these three segments can be merged, and the fourth partition can be migrated to its target location. For example, the target location can be node 120 or 140 as shown in FIG. 2. The embodiment as shown in FIGS. 5A-5B can implement a better Hash balance. Moreover, because the segments are partitioned and merged, an index can be rebuilt locally for each of the segments, and the segments can be moved as a whole to the target location.

It would be appreciated that embodiments of the present disclosure have been introduced above in combination of partitions and segments, but these terms are only provided as an example. For example, the partitions can be all replaced by shards or segments in the examples as shown in FIGS. 2-4B. For example, the partitions can also be referred to as shards in the examples as shown in FIGS. 5A-5B.

Table 1 shows comparative data of index management in the prior art and the embodiment as shown in FIGS. 5A-5B, in which the first column represents a number of documents, the second column represents comparison of percentages of numbers of documents to be moved or re-indexed when the number of partitions is increased from 4 to 5, the third column represents comparison of percentages of numbers of documents to be moved or re-indexed when the number of partitions is increased from 20 to 21, the fourth column represents comparison of percentages of numbers of documents to be moved or re-indexed when the number of partitions is increased from 99 to 100, each partition therein includes 5 segments, and each entry represents a ratio of a number of documents required to be re-indexed according to the prior art to a number of documents required to re-indexed according to embodiments of the present disclosure.

It can be seen from Table 1 that, as compared to the prior art, embodiments of the present disclosure bring about a substantially reduced number of documents to be re-indexed. The effect will be greatly improved as the number of partitions and document data increase.

TABLE 1

| Number of documents | 4->5 | 20->21 | 99->100 |
| --- | --- | --- | --- |
| 1000 | 80/20 | 94/4.762 | 90.1/1 |
| 10000 | 80/20 | 95.2/4.762 | 98.02/1 |
| 100000 | 80/20 | 95.22/4.762 | 98.911/1 |
| 1000000 | 80/20 | 95.238/4.762 | 98.9902/1 |

Figure 6:
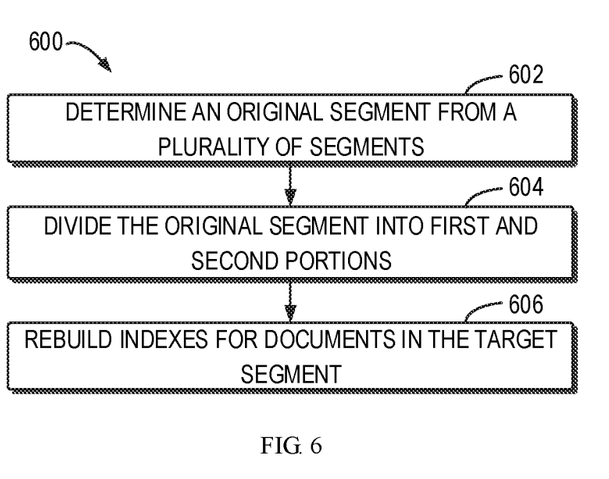
FIG. 6 illustrates a method of managing a document index according to embodiments of the present disclosure.

FIG. 6 illustrates a flowchart of a method 600 of managing a document index according to some embodiments. The method 600 can be performed by the cluster 100 as shown in FIG. 2.

At 602, in response to a first request for adding a target segment to a document set including a plurality of segments, an original segment associated with the target segment is determined from the plurality of segments. For example, the segments described herein may be the segments as shown in FIGS. 3A-4B. In these embodiments, the request for adding the target segment is a request for adding a partition, for example, adding a fourth partition to the first to third partitions 102-106. In some embodiments, the segments described herein may be the segments as shown in FIGS. 5A-5B, and the request for adding the target segment can be determined from the request for adding a segment (which can also be referred to as a shard). For example, the target partition can include three target segments, such that the request for increasing the target partition can also include three requests for increasing the target segment.

In some embodiments, a plurality of segments are associated with respective ranges of values on a closed ring. The value can be a Hash value. For example, as shown in FIG. 3A, each partition is associated with the respective value on the closed ring. In the embodiment, the value associated with the target segment can be determined, and the original segment can be determined based on the range of values on the closed ring which the value falls within. For example, if the value falls within a certain range of values, it is considered that the segment corresponding to the range of values is the original segment.

At 604, the original segment is divided into a first portion and a second portion. The first portion is used to update the original segments, and the second segment is used as the target segment.

In some embodiments, if it is determined that the value divides or splits the range of values into a first range of values and a second range of values, the original segment can be partitioned into a first portion and a second portion corresponding to the first range of values and the second range of values, respectively. Based on a predetermined direction associated with the closed ring, it can be determined that the first portion is used to update the original segment, and the second portion is used as the target segment.

At 606, an index is rebuilt for documents within the target segment. In some embodiments, for example, embodiments as shown in FIGS. 3A-4B only have to rebuild an index for a part of such documents and keep other documents unchanged, because only the level of the partition or segment is involved therein.

In some embodiments, as shown in FIGS. 5A-5B, a partition can include two levels. For example, a document set includes a plurality of shards, and each of the shards includes a predetermined number of segments from a plurality of segments. The predetermined number is 3 in the example of FIG. 5A. The method 600 can include, in response to receiving a second request for adding a target shard to a document set, determining a first request and a third request for adding a second target segment. There may be one or more third requests, and there may be one or more respective second target segments. For each third request, 602-604 can be repeated. In other words, in response to the third request, a second original segment associated with the second target segment can be determined from the plurality of segments. The second original segment is divided into a respective first portion and a respective second portion, the respective first portion is used to update the second original segment, and the respective second portion is used as a second target segment. An index is rebuilt for documents in the second target segment. The target segment and the second target segment can be merged to form a target shard. After an index has been rebuilt for the target segments, the target segments can be moved to a respective target location if necessary.

Figure 7:
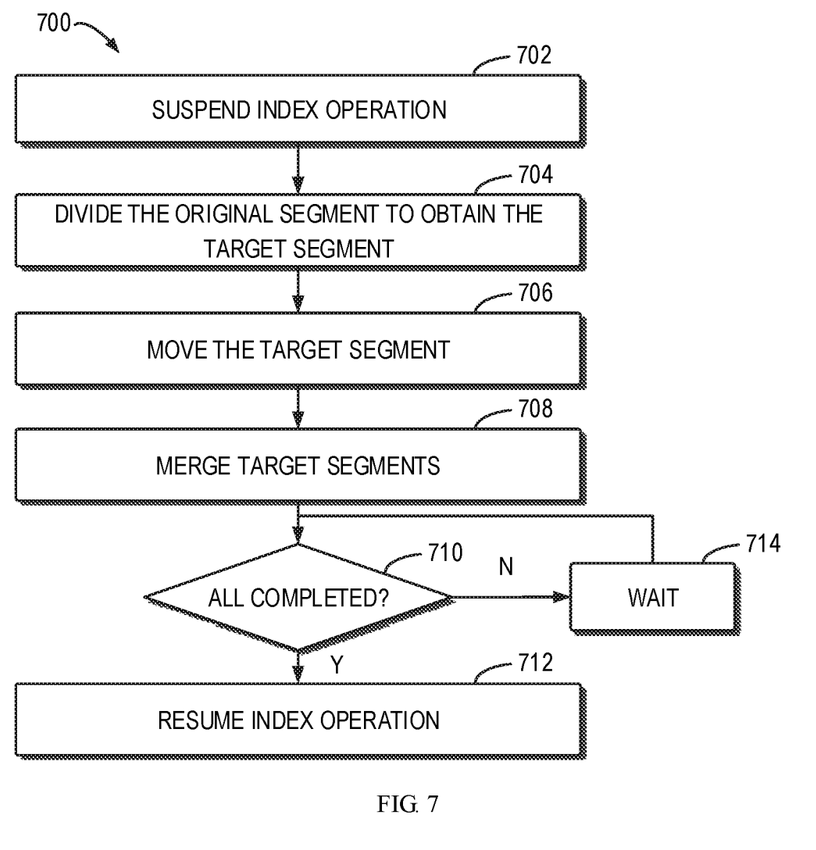
FIG. 7 illustrates a flowchart of a method of managing a document index according to embodiments of the present disclosure.

FIG. 7 illustrates a flowchart of a method 700 of managing a document index according to some embodiments of the present disclosure. The method 700 can be performed at the cluster 100.

At 702, an index operation can be suspended to prevent damage to the index operation when a partition is added. At 704, the respective segment can be partitioned to obtain a target segment. At 706, the obtained target segment can be moved to its target location if necessary. At 708, the target segments are merged to form a target shard. At 710, it is determined whether all the target segments are merged. If yes, the method 700 moves to 712 to restart the index operation. If no, the method 700 moves to 714 to wait for a time period, and then moves to 710 after the time period to determine whether all segments have been completed.

Figure 8:
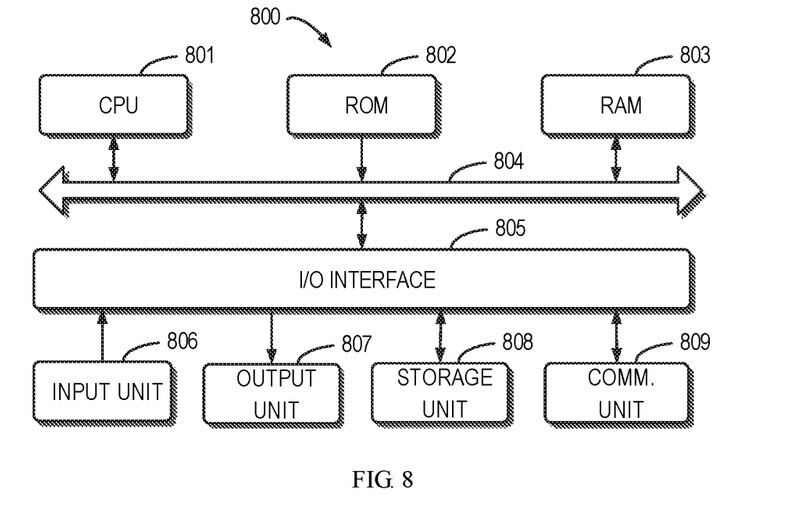
FIG. 8 illustrates a diagram of an example device that can be used to implement the embodiments of the present disclosure.

FIG. 8 illustrates an example device 800 that can implement embodiments of the present disclosure. As shown, the device 800 includes a central processing unit (CPU) 801 that can perform various appropriate acts and processing based on computer program instructions stored in a read-only memory (ROM) 802 or computer program instructions loaded from a storage unit 808 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

The following components in the device 800 are connected to the I/O interface 805: an input unit 806, such as a keyboard, a mouse and the like; an output unit 807, such as various kinds of displays and a loudspeaker, etc.; a storage unit 808, such as a magnetic disk, an optical disk, and etc.; a communication unit 809, such as a network card, a modem, and a wireless communication transceiver, etc. The communication unit 809 allows the device 800 to exchange information/data with other devices through a computer network such as the Internet and/or various kinds of telecommunications networks.

Various processes and processing described above, e.g., the method 300, can be executed by the processing unit 801. For example, in some embodiments, the method 300 can be implemented as a computer software program that is tangibly embodied on a machine readable medium, e.g., the storage unit 808. In some embodiments, part or all of the computer programs can be loaded and/or mounted onto the device 800 via ROM 802 and/or communication unit 808. When the computer program is loaded to the RAM 803 and executed by the CPU 801, one or more steps of the method 300 as described above can be executed. Alternatively, CPU 801 can also be configured to perform the method 300 as described above in any other appropriate manner (for example, by means of firmware).

The present disclosure can be a method, a device, a system and/or a computer program product. The computer program product can include a computer readable storage medium on which computer readable program instructions are carried out for performing each aspect of the present application.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the machine readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing document indexes, comprising:
   receiving a first request to add a target segment to a document set comprising a plurality of partitions, each partition comprising a predetermined number of segments of a plurality of segments, wherein the plurality of segments are associated with respective ranges of values on a closed ring;
   determining an original segment associated with the target segment from the plurality of segments, wherein determining the original segment comprises:
      determining a value associated with the target segment; and
      determining the original segment based on a range of values on the closed ring in which the value falls;
   partitioning the original segment into a first portion and a second portion, the partitioning comprising:
      determining that the value partitions the range of values into a first range of values and a second range of values,
      partitioning the original segment into the first and second portions corresponding to the first and second ranges of values, respectively; and
      determining, based on a predetermined direction associated with the closed ring, that the first portion corresponds to the original segment and that the second portion corresponds to the target segment; and
   rebuilding indexes for documents in the document set in the target segment;
   receiving a second request, to add a second target segment;
   in response to the second request, determining a second original segment associated with the second target segment from the plurality of segments;
   partitioning the second original segment into a third portion and a fourth portion, by determining, based on the predetermined direction associated with the closed ring, that the third portion corresponds to the second original segment and that the fourth portion corresponds to the second target segment;
   rebuilding indexes for documents in the document set in the second target segment; and
   receiving a third request for adding a target partition to the document set to increase performance of a system utilizing the indexes;
   after rebuilding the indexes for the documents in the second target segment and in response to the third request, merging the target segment and the second target segment to form the target partition.

2. The method according to claim 1, wherein determining the value comprises:
   determining the value associated with the target segment using a Hash algorithm.

3. The method according to claim 2, wherein the Hash algorithm is a Consistent Hash algorithm.

4. A device for managing document indexes, comprising:
   a processing unit; and
   a memory coupled to the processing unit and having instructions stored thereon, the instructions, when executed by the processing unit, causing the device to perform a method, the method comprising:
      receiving a first request to add a target segment to a document set comprising a plurality of partitions, each partition comprising a predetermined number of segments of a plurality of segments, wherein the plurality of segments are associated with respective ranges of values on a closed ring;
      determining an original segment associated with the target segment from the plurality of segments, wherein determining the original segment comprises:
         determining a value associated with the target segment; and
         determining the original segment based on a range of values on the closed ring in which the value falls;
      partitioning the original segment into a first portion and a second portion, the partitioning comprising:
         determining that the value partitions the range of values into a first range of values and a second range of values,
         partitioning the original segment into the first and second portions corresponding to the first and second ranges of values, respectively; and
         determining, based on a predetermined direction associated with the closed ring, that the first portion corresponds to the original segment and that the second portion corresponds to the target segment; and rebuilding indexes for documents in the document set in the target segment;

receiving a second request, to add a second target segment;

in response to the second request, determining a second original segment associated with the second target segment from the plurality of segments;

partitioning the second original segment into a third portion and a fourth portion, by determining, based on the predetermined direction associated with the closed ring, that the third portion corresponds to the second original segment and that the fourth portion corresponds to the second target segment;

rebuilding indexes for documents in the document set in the second target segment; and receiving a third request for adding a target partition to the document set to increase performance of a system utilizing the indexes;

after rebuilding the indexes for the documents in the second target segment and in response to the third request, merging the target segment and the second target segment to form the target partition.

5. The device according to claim 4, wherein determining the value comprises:

determining a value associated with the target segment using a Hash algorithm.

6. The device according to claim 5, wherein the Hash algorithm is a Consistent Hash algorithm.

7. A non-transitory computer readable medium storing machine executable instructions thereon which, when executed by at least one processor, cause the at least one processor to perform a method for managing document indexes, the method comprising:

receiving a first request to add a target segment to a document set comprising a plurality of partitions, each partition comprising a predetermined number of segments of a plurality of segments, wherein the plurality of segments are associated with respective ranges of values on a closed ring;

determining an original segment associated with the target segment from the plurality of segments;

partitioning the original segment in a first portion and a second portion, the partitioning comprising:

determining that the value partitions the range of values into a first range of values and a second range of values, partitioning the original segment into the first and second portions corresponding to the first and second ranges of values, respectively; and determining, based on a predetermined direction associated with the closed ring, that the first portion corresponds to the original segment and that the second portion corresponds to the target segment; and rebuilding indexes for documents in the document set in the target segment;

receiving a second request, to add a second target segment;

in response to the second request, determining a second original segment associated with the second target segment from the plurality of segments;

partitioning the second original segment into a third portion and a fourth portion, by determining, based on the predetermined direction associated with the closed ring, that the third portion corresponds to the second original segment and that the fourth portion corresponds to the second target segment;

rebuilding indexes for documents in the document set in the second target segment; and receiving a third request for adding a target partition to the document set to increase performance of a system utilizing the indexes;

after rebuilding the indexes for the documents in the second target segment and in response to the third request, merging the target segment and the second target segment to form the target partition.

8. The non-transitory computer readable medium according to claim 7, wherein determining the value comprises:

determining the value associated with the target segment using a Hash algorithm.

9. The non-transitory computer readable medium according to claim 8, wherein the Hash algorithm is a Consistent Hash algorithm.

* * * * *